(12) United States Patent
Khan et al.

(10) Patent No.: US 11,798,285 B2
(45) Date of Patent: Oct. 24, 2023

(54) FRICTIONLESS AND AUTONOMOUS ACTIVITY AND BEHAVIORAL MONITORING

(71) Applicant: NCR Corporation, Atlanta, GA (US)

(72) Inventors: Sudip Rahman Khan, Decatur, GA (US); Matthew Robert Burris, Atlanta, GA (US); Christopher John Costello, Suwanee, GA (US); Gregory Joseph Hartl, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 35 days.

(21) Appl. No.: 16/774,331

(22) Filed: Jan. 28, 2020

(65) Prior Publication Data
US 2021/0158055 A1 May 27, 2021

Related U.S. Application Data

(63) Continuation-in-part of application No. 16/724,560, filed on Dec. 23, 2019, now Pat. No. 11,238,554, and
(Continued)

(51) Int. Cl.
*G08B 13/24* (2006.01)
*G06V 20/52* (2022.01)
(Continued)

(52) U.S. Cl.
CPC ............ *G06V 20/53* (2022.01); *G06F 16/748* (2019.01); *G06F 16/784* (2019.01); *G06N 20/00* (2019.01);
(Continued)

(58) Field of Classification Search
CPC ........... G06K 9/00778; G06K 9/00355; G06K 9/00691; G06K 9/00718; G06F 16/784; G06F 16/748; G06N 20/00
(Continued)

(56) References Cited

U.S. PATENT DOCUMENTS

| 7,061,450 B2 * | 6/2006 | Bright ................. | G02B 27/017 235/462.32 |
| 2008/0101658 A1 * | 5/2008 | Ahern ................. | G06K 9/6217 382/115 |

(Continued)

*Primary Examiner* — Nguyen T Truong
(74) *Attorney, Agent, or Firm* — Schwegman Lundberg & Woessner, P.A.

(57) ABSTRACT

Individuals, business transactions, and business activities are monitored for actions and behaviors of the individuals during performance of establishment processes through video feeds captured by cameras, sensor data captured by sensors, and information captured by transaction systems. Transaction/activity information associated with transactions/activities being processed by a transaction system of the establishment or performed by individuals within the establishment are monitored. The actions, behaviors, transaction information, activity information, and establishment processes are correlated to process controls, policies, and procedures of the establishment and logged. Non-compliant actions, behaviors, transaction information, activity information, and/or transaction/activity thresholds generate real-time remedial actions, such as audits, training, and notifications. In an embodiment, an interface is provided for mining, correlating, searching, and reporting the logged data with respect to specific types of transactions/actions. In an embodiment, the logged data is automatically formatted in a target format and provided to an automated system for consumption.

20 Claims, 4 Drawing Sheets

Related U.S. Application Data a continuation-in-part of application No. 16/696,870, filed on Nov. 26, 2019, now Pat. No. 11,321,655.

(51) Int. Cl.

| | | |
|---|---|---|
| *G06N 20/00* | (2019.01) | |
| *G06F 16/74* | (2019.01) | |
| *G06F 16/783* | (2019.01) | |
| *G06V 20/00* | (2022.01) | |
| *G06V 20/40* | (2022.01) | |
| *G06V 40/20* | (2022.01) | |

(52) U.S. Cl.
CPC .............. *G06V 20/36* (2022.01); *G06V 20/41* (2022.01); *G06V 40/20* (2022.01)

(58) Field of Classification Search
USPC ........................................................ 348/143
See application file for complete search history.

(56) References Cited

U.S. PATENT DOCUMENTS

| | | | |
|---|---|---|---|
| 2015/0033305 A1* | 1/2015 | Shear .................... | G06F 21/53 726/6 |
| 2016/0019514 A1* | 1/2016 | Landers, Jr. ......... | G06Q 20/202 705/20 |
| 2016/0035198 A1* | 2/2016 | Coviello .......... | G08B 13/19695 340/541 |
| 2016/0048726 A1* | 2/2016 | Tang .................... | G06F 3/0304 382/103 |
| 2016/0189455 A1* | 6/2016 | Lee ......................... | G07C 9/37 340/5.52 |
| 2016/0301691 A1* | 10/2016 | Miller ...................... | G01S 5/14 |
| 2016/0308859 A1* | 10/2016 | Barry .................. | G06K 9/2036 |
| 2016/0364927 A1* | 12/2016 | Barry .................... | H04L 41/06 |
| 2017/0027045 A1* | 1/2017 | Chemel .................. | H05B 45/10 |
| 2018/0239953 A1* | 8/2018 | Miwa ................. | G06K 9/00228 |
| 2019/0354774 A1* | 11/2019 | Leizerovich ..... | G08B 13/19695 |

\* cited by examiner

FRICTIONLESS AND AUTONOMOUS ACTIVITY AND BEHAVIORAL MONITORING

RELATED APPLICATIONS

The present application is a Continuation-In Part (CIP) of co-pending application Ser. No. 16/696,870 filed Nov. 26, 2019 and entitled: "Frictionless and Autonomous Control Processing" and application Ser. No. 16/724,560 filed Dec. 23, 2019 and entitled: "Frictionless Security Monitoring and Management;" the disclosures of which in their entireties are incorporated by reference herein.

BACKGROUND

Enterprises have a variety of controls that are required during performance of business processes and tasks. Some are specific to a given enterprise and some are government regulated and specific to a type of enterprise. For example, bank branches must follow a myriad of processes and procedures to ensure federal and internal company standards are being followed and to minimize risk exposure of the branches.

Among other things, processes and procedures require the monitoring of staff and money movements using logs maintained online and offsite. The processes and procedures also require that the bank provide onsite training to ensure that staff are adequately equipped to follow the proper protocols of the bank with respect to compliance associated with the maintaining the logs. Still further, staff must know how to remediate any violations that are known to occur within the bank. The processes and procedures are periodically revised by both the banks and the federal government that regulates the bank processes and procedures.

As long as humans/staff are involved in a process, training, monitoring, auditing, and retraining will be necessary and required. Banks invest substantial amounts of money and time, maintaining processes, tracking processes, auditing processes, and training staff on the processes. Human error is a frequently occurring problem, which results in problematic auditing or dubious auditing results.

Today, bank branches spend a lot of employee time maintaining and auditing numerous logs. Furthermore, the amount of training required to get employees familiarized with each process can be quite substantial. Bank operations generally require staff to undergo refresher training on a yearly basis. Regional and corporate bank staff that monitor anomalies in branch activities, fraud, and violations of procedures also spend a lot of time defining, implementing and training changes.

Employees responsible for audit functions in the bank are also required to "randomly" check logs by taking a small subset of log data to analyze discrepancies. This method does not ensure that all discrepancies are discovered, resulting in the bank factoring in higher operational cost budgets for each branch.

SUMMARY

In various embodiments, methods and a system for frictionless and autonomous activity and behavioral monitoring are presented.

According to an embodiment, a method for frictionless and autonomous activity and behavioral monitoring is presented. An activity that is initiated within an establishment is identified. Control data with respect to the activity is obtained. The activity is monitored through video feeds and activity data provided with the activity as the activity is performed or as the activity progresses in accordance with the control data. Monitored data is recorded for the activity. The monitored data is associated with the activity data and the video feeds as activity audit data. At least one automated action is processed based on at least one threshold exceeded as determined from the activity audit data.

DETAILED DESCRIPTION

Figure 1:
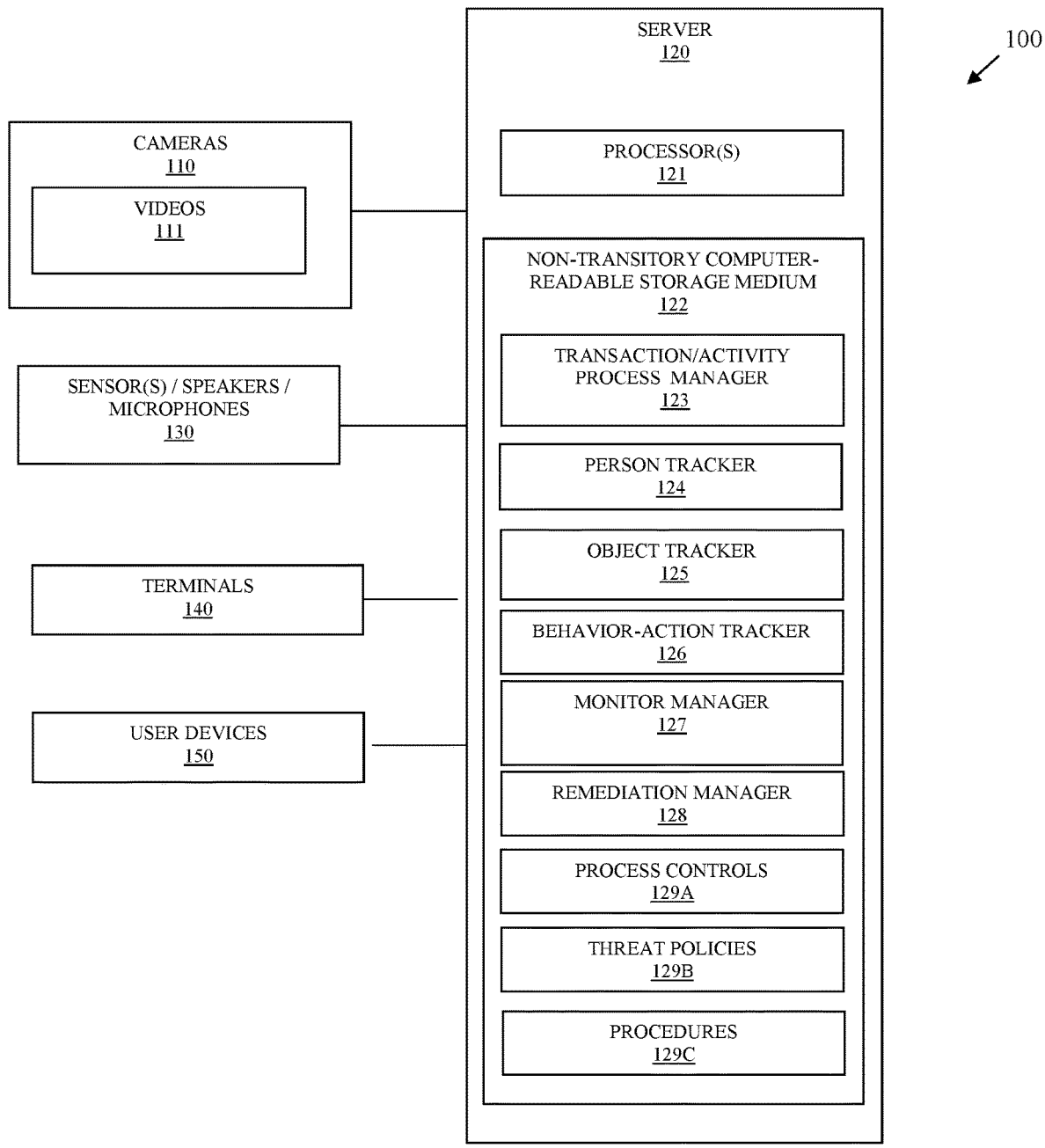
FIG. 1 is a diagram of a system for frictionless and autonomous activity and behavioral monitoring, according to an example embodiment.

FIG. 1 is a diagram of a system 100 for frictionless and autonomous activity and behavioral monitoring according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of frictionless and autonomous activity and behavioral monitoring, presented herein and below.

System 100 is a full autonomous process/procedure monitoring and remediation system that may utilize transaction-based data, audio, and computer vision to monitor activities and behaviors occurring within an establishment for compliance, improvement, fraud detection, and/or remediation. System 100 also provides metrics regarding the activities and the behaviors for purposes of discovering and continuously improving an existing establishment's processes/procedures.

As used herein and below, the terms "user," "personnel," "actor," "person," "individual," and "subject" may be used interchangeably and synonymously. The terms refer to an individual detected within a monitored area within an establishment.

A "business process," as used herein, refers to a set of predefined actions required in performance of a predefined business procedure/process of an establishment. A "set of predefined actions" may also be referred to herein as "activities."

The phrases "process controls," "threat policies," and "procedures" refer to data structures that define different types of sets of actions that are being monitored within an establishment. Process controls are a type of activity associated with auditing sets of actions that are determined to be required for auditing and compliance. Threat policies are a type of activity that does or that could potentially indicate fraud, theft, or threat of violence within the establishment. Procedures are a type of activity that defines an establishment's internal operations for business processes/operations with respect to handling assets, interacting with individuals, and/or performing internal operations.

An "object" refers to a secure asset, a non-secure asset, and/or a structure located within the establishment. The object may include drawers, computers, keys, cash, checks, tables, security panels, chairs, windows, notary stamps, doors, documents, terminals, countertops, shelving, money, checks, safety deposit boxes, items being sold within the establishment, etc. that are being monitored within the image frames of one or more videos provided in video feeds.

System 100 includes a plurality of cameras 110 that capture time-stamped videos of persons and objects outside and on a premise of an establishment and within the establishment. System 100 includes terminals 140 used to process transactions associated with the establishment and user-operated devices 150 used to communicate with users and/or assist customers or other staff of the enterprise. System 100 also includes sensors, speakers, and microphones 130 dispersed throughout the establishment and/or integrated into other devices, such as terminals 140.

Moreover, system 100 also includes server 120. Server 120 includes executable instructions that execute on one or more hardware processors 121 of server 120 from a non-transitory computer-readable storage medium 122 as: transaction/activity process manager 123, person tracker 124, object tracker 125, behavior-action tracker 126, monitor manager 127, and remediation manager 128.

Non-transitory computer-readable-storage medium 122 of server 120 also includes the process controls 129A, threat policies 129B, and procedures 129C.

Process controls 129A, threat policies 129B, and procedures 129C represent data structures comprising and embodying business rules associated with a predefined business process or task of an establishment relevant to auditing (process controls 129A), security (threat policies 129B), and business processes/operations (procedures 129C). The data structures include statements of area identifiers, asset/object identifiers, action identifiers, behavior identifiers, security role identifiers for security roles and responsibilities, transaction data identifiers for types of transaction data required for any given task (when a transaction is taking place or is a monitored set of activities), task identifiers that identify specific tasks, and conditions that defines rules. Each rule identifying a task and required actions, behaviors, and any transaction information, audit information, or business operation information for that task. Tasks can be required, permissible but not required, and/or impermissible/prohibited. The sequence of the tasks may also be defined within the conditions for the rules. Each rule may also include a resource identifier or a processing action that is to be processed when a given rule is violated. The resource associated with the resource identifier may be an automated application, a system, or an electronic contact address of an individual.

A given "task" may also be referred to as a set of predefined activities or activities as discussed above.

It is to be noted that there may be multiple servers 120, such that the different elements 123-128 may execute on a same server 120 or multiple different servers 120 networked together within a cloud processing environment.

Cameras 110 are preconfigured to capture videos 111 of areas that are inside and outside the establishment based on the field-of-view of the lenses of cameras 110. Some of cameras 110 may capture images 111 representing portions of a different area than a different one of the cameras 110 captures video 111 for. That is, each video 111 can include frames that may overlap multiple ones of the defined areas covered in the field-of-view of a different camera 110.

In an embodiment, the cameras 110 can be situated at different angles and heights within the areas where they are located. Some cameras 110 may be at waist level, chest level, or head level to an average sized person and directed in different directions upward or downward slightly for purposes of capturing the eyes of individuals within the room. Additionally, there may be one or more overhead cameras 110 both inside and outside the establishment. Some cameras 110 may be specifically calibrated to capture eyes and faces of the individuals.

Initially, cameras 110 are situated in locations throughout the establishment and some of the one or more cameras 110 may situated on the outside of the establishment to capture the egress and ingress point of the establishment and optionally to capture a parking lot associated with the establishment Each camera lens configured to cover one or more predefined areas both inside and outside the establishment.

Furthermore, metadata is assigned to each camera 110 to include a unique camera identifier, a location identifier (representing the physical location that camera 110 is situated), and one or more area identifiers (representing the predefined areas that the lens and field-of-view of camera 110 captures in the video 111).

Terminals 140 comprise processing devices that are operated by employees and/or customers of the establishment during transactions, when performing electronic business operations, and/or when obtaining information or providing information. Transactions may comprise processing actions initiated by the employees in performance of a portion of a task associated with the establishment.

Transaction/activity process manager 123 receives transaction identifiers or activity identifiers from terminals 140 as well as operation identifiers for operations being performed and parameter data supplied as input to the operations by the employees or customers during transactions or activities at terminals 140.

Transaction/activity process manager 123 supplies transaction identifiers or activity identifiers, operation identifiers, and parameter data as transaction information or activity information to monitor manager 127 in real time as transactions or activities that are being processed on terminals 140.

Transaction/activity process manager 123 may also be activated based on a known schedule or based upon a detected event received at a date and time for which a task is required. For example, transaction/activity process manager 123 may receive device location reports from user devices 150. When a location for a user device 150 is within a geofenced area of the establishment at time associated with opening the establishment, transaction/activity process manager 123 may initiate an opening task defined in procedures 129C.

Person tracker 124 analyzes pixels in video frames of video feeds 111 and uses a bounding box or region of interest within the pixels to track locations of the individuals and extremities (arms, hands) of the individuals within a known area of the establishment based on the area identifiers associated with cameras 110.

Object tracker 125 monitors the structures and assets within the establishment via bounding boxes or regions of interest within pixels of the image frames for the video feeds 111.

Behavior-action tracker 127 utilizes the bounding boxes associated with each individual and the objects to perform more detailed pixel analysis on facial features of the individuals and identify behaviors identified by specific behavior identifiers. Moreover, location information within the pixels for the bounding boxes of the individuals and the objects are used by behavior-action tracker 127 to identify actions that corresponding to action identifiers.

Monitor manager 127 utilizes transaction information or activity information supplied by terminals 140 and/or user devices 150 and manager 127 utilizes location information of the bounding boxes for the each individual within or on a premises of the establishment against known locations within the establishment with: person identifiers provided by person tracker 124, the object identifiers provided by object tracker 125, action identifiers provided by behavior-action tracker 126, and behavior identifiers provided by tracker 126 to evaluate process controls 129A, threat policies 129B, and procedures 129C. Manager 127 uses this information to determine when the corresponding persons, actions, behaviors, and transaction or activity information are being performed and processed in a manner defined by controls 129A, policies 129B, and/or procedures 129C.

The monitor manager 127 plugs in the identifiers into the controls 129A, policies 129B, and/or procedures 129C and evaluates the conditions to determine whether a given task associated with a given establishment activity is being completed correctly, incorrectly, and/or poses a security threat. Controls 129A, policies 129B, and procedures 129C provide processing actions that are to be taken by monitor manager 127 when a given task/activity is associated with a correct set of actions, behaviors, operations, and data, in a correct sequence, and controls 129A, policies 129B, and 129C provide other processing actions that are to be taken by monitor manager 127 when a given task/activity includes incorrect or impermissible actions, behaviors, operations, and data in an incorrect sequence, and/or are being performed in a manner indicating a threat.

Manager 123 and trackers 124-126 provides identifiers and location information for both a given transaction or a given activity, one or more individuals/subjects from video feeds 111, and objects, and monitor manager 127 determines from controls 129A, policies 129B, and policies 129C when a given establishment task/activity was or is being completed correctly, incorrectly, or in a threatening manner, in accordance with conditions defined within rules of controls 129A, policies 129B, and procedures 129C.

Monitor manager 127 also time and date stamps entries along with individual identifiers identified for the individuals from video feed 111, action identifiers, behavior identifiers, transaction identifiers, transaction operation identifiers, activity operations identifiers, transaction parameter data, activity parameter data, and task/activity identifiers associated with rules of controls 129A, policies 129B, and procedures 129C in a security log and/or audit log.

Monitor manager 127 is configured to look for predefined transaction/activity types associated with transaction/activity information supplied by terminals 140 and user devices 150 and/or predefined action identifiers supplied by behavior-action tracker 126. The transaction/activity type and/or action identifier is used by monitor manager 127 to obtain specific controls 129A, policies 129B, and procedures 129C. The specific controls 129A, policies 129B, and policies 129C are then evaluated in the manners discussed above by monitor manager 127.

Some non-compliant actions, non-compliant behaviors, and non-compliant transaction information may be identified in the corresponding controls 129A, policies 129B, and procedures 129C to cause monitor 128 to initiate and engage remediation manager 128. Remediation manager 128 may, based on the task identifier and the non-compliant identifiers, take a variety of processing actions, such as and by way of example only, 1) engage an individual conducting a transaction or a task/activity in a natural-language voice dialogue using speakers and microphones 130 (or speakers and microphones embedded in devices 150 or terminals 140), 2) schedule a remediation training from an offending individual associated with the non-compliant actions, non-compliant behaviors, or non-compliant transaction information; 3) send assistance information to a device 150 associated with the offending individual for correctly performing the tasks; 4) initiate security procedures in a threat of violence through a security system; 5) suspend a transaction occurring on terminal 140; 6) request a transaction be approved by a second staff member at terminal 140; 7) place a watch on an account of an individual conducting a transaction; 8) and/or 9) generate a video clip from video feed 111 that corresponds to the non-compliant actions, the non-compliant behaviors, or non-compliant transaction information and send the video clip to the offending individual and/or a supervisor of the offending individual.

Remediation manager 128 may engage in any natural-language dialogue with the offending individual using a speaker and a microphone integrated into terminal 140, a user-operated mobile device 150, and/or network-based microphones and speakers 130 situated throughout the establishment. Additionally, the natural language dialogue may be conducted using a network-based appliance that is part of the Internet-of-Things (IoTs) and that is equipped with both a microphone and a speaker.

Remediation manager 128 may interface with a scheduling and training system associated with the establishment for purposes of scheduling remediation training.

Monitor manager 127 ensures that activity identifiers for activities, transaction identifiers for transactions, action identifiers, individual identifiers, identifiers for invoked controls 129A/policies 129B/Procedures 129C, object identifiers, location identifiers, establishment identifiers, transaction details, activity details, elapsed time for actions, video clips, and audit clips are logged in one or more logs. Some of the logs may be specifically identified as audit logs. The controls 129A/policies 129B/Procedures 129C may include thresholds on values of the captured activity and transaction details that invoke the remediation manager 128.

Remediation manager 128 may package the logged data and trigger audits manual or automated based on the exceeded thresholds. Remediation manager 128 may also trigger training of a machine-learning algorithm and/or training for staff based on the exceeded thresholds. Additionally, the collected data may be stored and used to generated statistics for given types of transactions and/or activities of the establishment.

System 100 is particularly beneficial in monitoring thresholds to trigger processes or fraud audits based on the captured frictionless branch data collected. That is, the data captured for transactions and activities are stored (including video clips and audio clips corresponding to the transactions and activities) in one or more logs as frictionless bank operations data. Remediation manager 128 may monitor thresholds and automatically trigger the logged data for consumption by specific individuals and/or automated systems, such as machine-learning algorithms for training, audit systems, security systems, etc. Monitor manager 127 may monitor changes in branch operation data based on audits triggered by an audit system, third-party auditors, and/or the establishment (bank, etc.).

In an embodiment, a given task/activity may be defined within controls 129A, policies 129B, and procedures 129C based on roles assigned to multiple individuals and actions required by each individual with respect to that individual's defined role. In such embodiment, compliance monitor 127 is further enabled to assign role identifiers for the multiple individuals based on individual identifiers determined by person tracker 124 and/or behavior-action tracker 126.

In an embodiment, monitor manager 127 is further configured to raise an alert based on a given processing action within controls 129. The alert can be sent to a security system and/or to one or more predefined individuals. Monitor manager 127 may also stream the video feed 111 associated with any non-compliance to a security monitor for real-time viewing in connection with the alert.

Each camera 110 provides time stamp and image-frame stamped video 111 to server 120. This video 111 can be streamed over a wired or wireless connection between cameras 110 and server 120 to a commonly accessible storage area on server 120 that is accessible to person tracker 124, object tracker 123, action tracker 126, and audit-notification manager 127.

Each accessible video frame of each video feed 111 includes its metadata (minimally including what was discussed above) with its video frame on the server 120.

Some example situations that utilize system 100 are now discussed for further illustration of the embodiments discussed herein.

In a first example scenario, system 100 monitors dual process activities and staff behavior for activity or transaction anomalies, such as: 1) allowing secured assets to be unattended; 2) allowing unauthorized individuals access to secure assets; 3) abnormal length of time required to perform the dual process activities or abnormal number of actions during the dual process activities; 4) abnormal size of transactions or abnormal normal of transactions; 5) abnormal association of branch staff with dual control activities and transactions; and/or 6) behavioral indicators of stress, dishonesty, tension, and other physiological responses.

In a second example scenario, monitor manager 127 tags and/or scores events, activities, and/or transactions. When the score exceeds a pre-determined threshold, a bank process is triggered in response thereto. Remediation manager 128 may focus on auditing actions that focus on reviewing, validating, and correcting behaviors related to branch and bank processes that ensure proper operation of the bank, especially concerning the financial responsibility to its consumers. Remediation manager 128 may also focus on fraud-avoidance actions that focus on reviewing, validating, and correcting suspected fraudulent transactions processed by the branch.

In a third example scenario, for each activity triggered, the bank can determine what information is provided, and to what systems, to enable the appropriate response. The information or data may include: 1) identification of staff members; 2) consumer account identifiers; 3) transaction types; 4) dates of interest; 5) branches involved; 6) geographical areas involved; 7) transaction details; 8) violation details; and/or 9) associated and inferred details from financial business organization collected data and other systems. The data may also be routed and provided in appropriate means to one or several of the following endpoints: 1) branch manager; 2) regional manager; 3) dedicated audit staff; 4) third-party auditor; and/or 5)) Audit or anti-fraud system.

In a fourth example scenario, the system 100 may be processed to continue to monitor critical elements around process audit threshold violations and fraud threshold violations for changes in behavior or transaction data associated with the violation, or staff member. When detected, the full data record is marked as appropriate and made available for machine-learning training to support enhanced branch activity monitoring for process, fraud, and suspect violations. The audit processing may comprise: 1) an audit review triggered by bank staff, third-party auditors, their systems or through frictionless branch operations monitoring and auditing systems; 2) a triggered audit may provide details on the nature, scope, and/or scale of the audit needs if known to bound, sort, and infer potential correlations, some or all of the following information may be processed: 1) identification of staff members; 2) consumer accounts; 3) transaction types; 4) dates of interest; 5) branches involved; 6) geographical areas involved; 7) and/or transaction details.

In a fifth scenario, the system 100 delivers compiled data in a desired output format for individual or automated system consumption and flags the associated data for monitoring. When the system 100 detects changes in flagged data associated with an audit, the data packet associated with the audit request is updated with the change. Other documentation and labeling of the data packet may be provided by individuals or systems used to conduct the audit to provide additional context to the audit findings. These data packets may be provided for consumption by machine-learning training to improve financial business organization monitoring.

One now appreciates how system 100 can be used as a real-time frictionless (no user action is required) autonomous activity and behavior monitoring mechanism that monitors, tracks, and remediates an establishments business operations, security operations, and audit operations. Individuals of the establishments may not be required to make entries in any security log; although in some cases this may still be required to cross check frictionless security system 100. Moreover, non-compliant actions, behaviors, transaction information, and activity information may cause alarms of different levels of severity as defined in controls 129. Threats are automatically identified, and a security system is alerted to dispatch authorities when needed. As previously discussed, audits may be automatically initiated, and the collected data may serve as input to any initiated audit or support an existing audit. Furthermore, business operations may be changed based on statistics generated with respect to the collected frictionless establishment operation data.

A variety of scenarios are possible with system 100 some of which but not all of which are now discussed.

Person tracker 124 may be equipped with biometric recognition, such that facial features of the individuals being tracked can be derived from the pixels of the video frames and matched to a registered individual or the enterprise. An enterprise identifier for the individual may then be recorded within the security log with the security log entries. For example, facial recognition may ensure that the individuals are the expected authorized employees performing the audit tasks or procedures of the establishment.

It is noted that other biometric features may be used as well, such as and my way of example only, a fingerprint provided by a security system indicating that the individual was authenticated for performing a given task, a retina scan, a digit distance and length measurement, a palm reader, a voice print (captured by a microphone 130), etc. Additionally, features from the video feeds 111 do not have to only include facial features and can include any combination of features or a single set of features associated with the individuals: gait, extremity length, height, and/or facial features.

In an embodiment, monitor manager 127 listens for keywords spoken an individual captured from microphones 130. When a keyword associated with distress is spoken, monitor manager 127 raises a silent alarm and may notify one or more other individuals associated with the establishment.

Monitor manager 127 may utilize a variety of sensors 130 after individuals have left or entered different rooms of the establishment after completion of a given auditable task. Monitor manager 127 may also utilizes sensors 130 to check that doors to rooms or drawers are in an appropriate state of unlocked or locked.

In an embodiment, monitor manager 127 maintains metrics associated with employees performing tasks (including transactions), such as time associated with a given task as a whole, time associated with a given action of a task, time associated with a given set of actions of a task, etc. Monitor manager 127 may then provide an interface for searching, reporting, and mining the metrics. This can be used for continuous process improvements associated with the tasks, non-reputable evidence of non-compliance infractions associated with a given employee, and/or for employee evaluation and discipline.

In an embodiment, components of system 100 may include one or more trained-machine learning algorithms to assist in the tracking, monitoring, and remediation of actions and behaviors or the individuals engaged in tasks of the establishment.

The above-noted embodiments and other embodiments are now discussed with reference to FIGS. 2-4.

Figure 2:
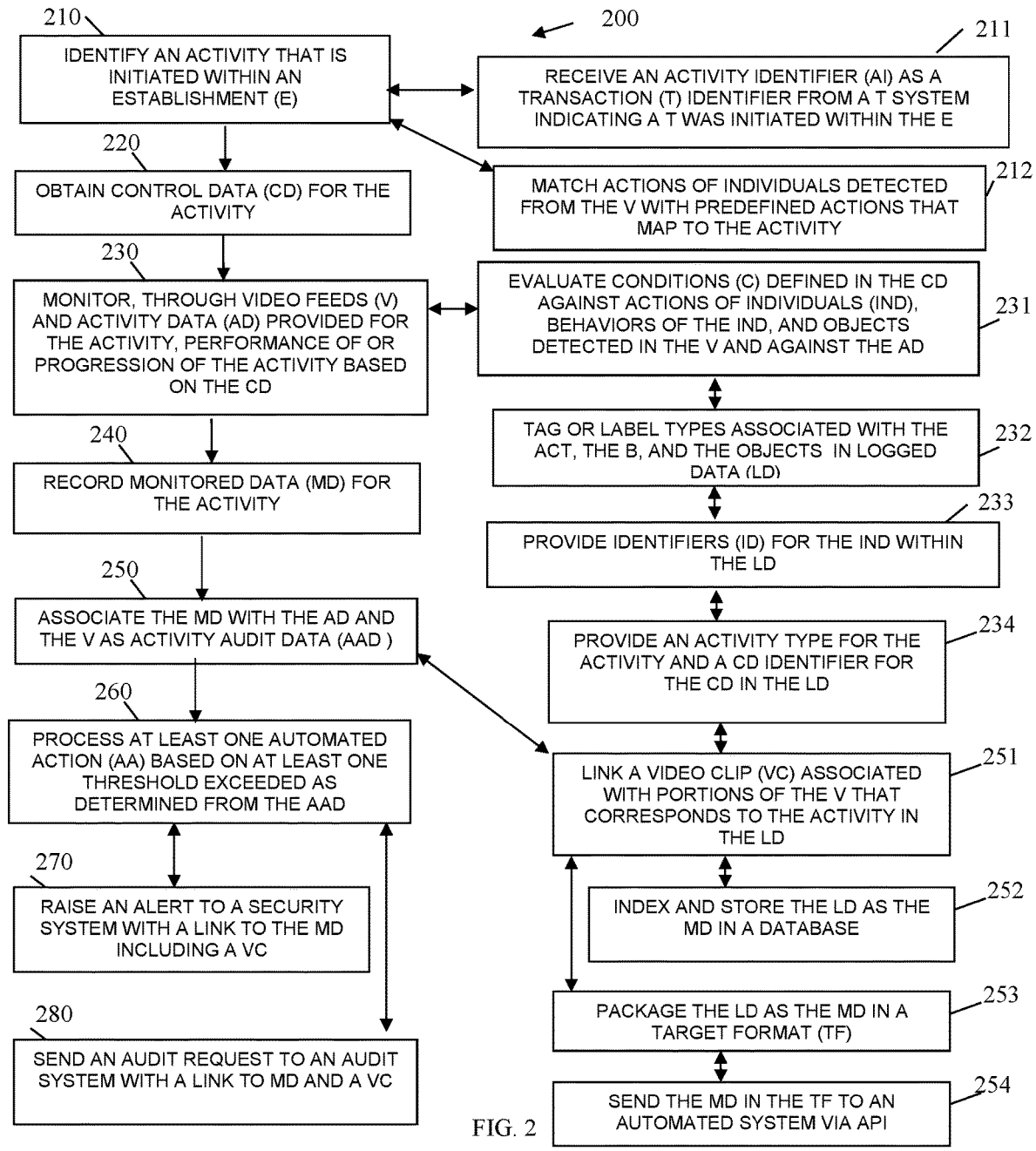
FIG. 2 is a diagram of a method frictionless and autonomous activity and behavioral monitoring, according to an example embodiment.

FIG. 2 is a diagram of a method 200 frictionless and autonomous activity and behavioral monitoring, according to an example embodiment. The software module(s) that implements the method 200 is referred to as a "frictionless activity monitor." The frictionless activity monitor is implemented as executable instructions programmed and residing within memory and/or a non-transitory computer-readable (processor-readable) storage medium and executed by one or more processors of a device. The processor(s) of the device that executes the frictionless activity monitor are specifically configured and programmed to process the frictionless activity monitor. The frictionless activity monitor may have access to one or more network connections during its processing. The network connections can be wired, wireless, or a combination of wired and wireless.

In an embodiment, the device that executes the frictionless activity monitor is server 120. In an embodiment, server 120 is a cloud-based server, a local-area network (LAN)-based server, or a wide-area network (WAN) server.

In an embodiment, the frictionless activity monitor is all or some combination of: person tracker 124, object tracker 125, behavior-action tracker 126, monitor manager 127, and/or remediation manager 128.

At 210, the frictionless activity monitor identifies an activity that is initiated within an establishment.

In an embodiment, at 211, the frictionless activity monitor receives an activity identifier as a transaction identifier from a transaction system indicating that a transaction was initiated within the establishment.

In an embodiment, at 212, the frictionless activity monitor matches actions of individuals detected from video feeds with predefined actions that map to the activity.

At 220, the frictionless activity monitor obtains control data for the activity. In an embodiment, the control data is one or more of: the process controls 129A, the threat policies 129B, and/or the procedures 129C.

At 230, the frictionless activity monitor monitors, through video feeds and activity data provided for the activity, performance of or progression of the activity based on the control data.

In an embodiment, at 231, the frictionless activity monitor evaluates conditions defined in the control data against actions of individuals, behaviors of the individuals, and objects detected in the video and the frictionless activity monitor evaluates the conditions against the activity data.

In an embodiment of 231 and at 232, the frictionless activity monitor tags or labels types associated with the actions, the behaviors, and the objects in logged data.

In an embodiment of 232 and at 233, the frictionless activity monitor provides identifiers for the individuals within the logged data.

In an embodiment of 233 and at 234, the frictionless activity monitor provides an activity type for the activity and a control data identifier for the control data in the logged data.

At 240, the frictionless activity monitor records monitored data for the activity.

At 250, the frictionless activity monitor associates the monitored data with the activity data and the video as activity audit data.

In an embodiment of 234 and 250, at 251, the frictionless activity monitor links a video clip associated portions of the video that correspond to the activity in the activity log.

In an embodiment of 251 and at 252, the frictionless activity monitor indexes and stores the logged data as the monitored data in a database.

In an embodiment of 251 and at 253, the frictionless activity monitor packages the logged data as the monitored data in a target format.

In an embodiment of 235 and at 254, the frictionless activity monitor sends the monitored data in the target format to an automated system via an API. In an embodiment, the automated system is an audit system, a security system, and/or a staff-based training system.

At 260, the frictionless activity monitor processes at least one automated action based on at least one threshold exceeded as determined from the activity audit data.

In an embodiment, at 270, the frictionless activity monitor raises an alert to a security system with a link to the monitored data and including a link to a video clip that corresponds to the video feeds associated with performance and progression of the activity.

In an embodiment, at 280, the frictionless activity monitor sends an audit request to an audit system with a link to the monitored data and a video clip that corresponds to the video feeds associated with performance and progression of the activity.

Figure 3:
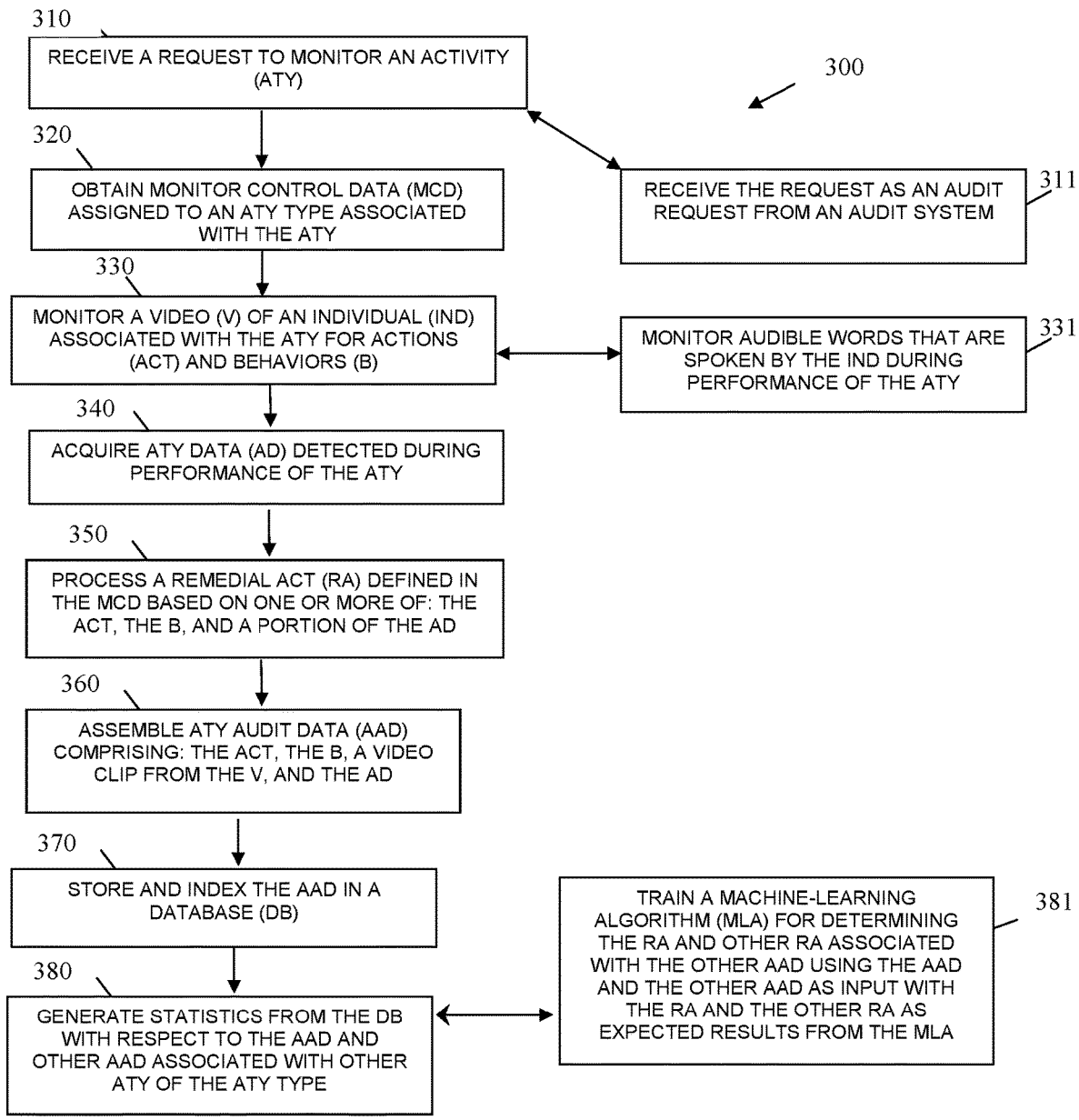
FIG. 3 is a diagram of another method for frictionless and autonomous activity and behavioral monitoring, according to an example embodiment.

FIG. 3 is a diagram of another method 300 for frictionless and autonomous activity and behavioral monitoring, according to an example embodiment. The software module(s) that implements the method 300 is referred to as an "autonomous process monitor." The autonomous process monitor is implemented as executable instructions programmed and residing within memory and/or a non-transitory computer-readable (processor-readable) storage medium and executed by one or more processors of a device. The processors that execute the autonomous process monitor are specifically configured and programmed to process autonomous process monitor. The autonomous process monitor may have access to one or more network connections during its processing. The network connections can be wired, wireless, or a combination of wired and wireless.

In an embodiment, the device that executes the autonomous process monitor is the server 120. In an embodiment, the server 120 is a cloud processing environment, a LAN server, or a WAN server.

In an embodiment, the autonomous process monitor is all of or some combination of: person tracker 124, object tracker 125, behavior-action tracker 126, monitor manager 127, remediation manager 128, and/or the method 300.

The autonomous process monitor presents another and, in some ways, enhanced processing perspective of the method 200 discussed above.

At 310, the autonomous process monitor receives a request to monitor an activity. In an embodiment, the activity is a transaction being performed within an establishment. In an embodiment, the activity is a business processor or operation being performed by one or more individuals.

In an embodiment, at 311, the autonomous process monitor receives the request as an audit request from an audit system.

At 320, the autonomous process monitor obtains monitor control data assigned to an activity type associated with the activity.

At 330, the autonomous process monitor monitors a video of an individual associated with the activity for actions and behaviors.

In an embodiment, at 331, the autonomous process monitor monitors audible words that are spoken by the individual during performance and/or progression of performance of the activity.

At 340, the autonomous process monitor acquires activity data detected during performance and/or progression of the activity.

At 350, the autonomous process monitor processes a remedial action defined in the monitor control data based on one or more of: the actions, the behaviors, and at least a portion of the activity data.

At 360, the autonomous process monitor assembles activity audit data comprising: the actions, the behaviors, a video clip from the video, and the activity data.

At 370, the autonomous process monitor stores and indexes the activity audit data in a database.

In an embodiment, at 380, the autonomous process monitor generates statistics from the database with respect to or for the activity audit data and other activity audit data associated with other activities of the same activity type as the activity.

In an embodiment, at 381, the autonomous process monitor trains a machine-learning algorithm for determining the remedial action and other remedial actions associated with the other activity audit data using the activity audit data and the other activity audit data as input to the machine-learning algorithm and using the remedial action and the other remedial actions as expected results that are expected to be provided by the machine-learning algorithm based on the input.

Figure 4:
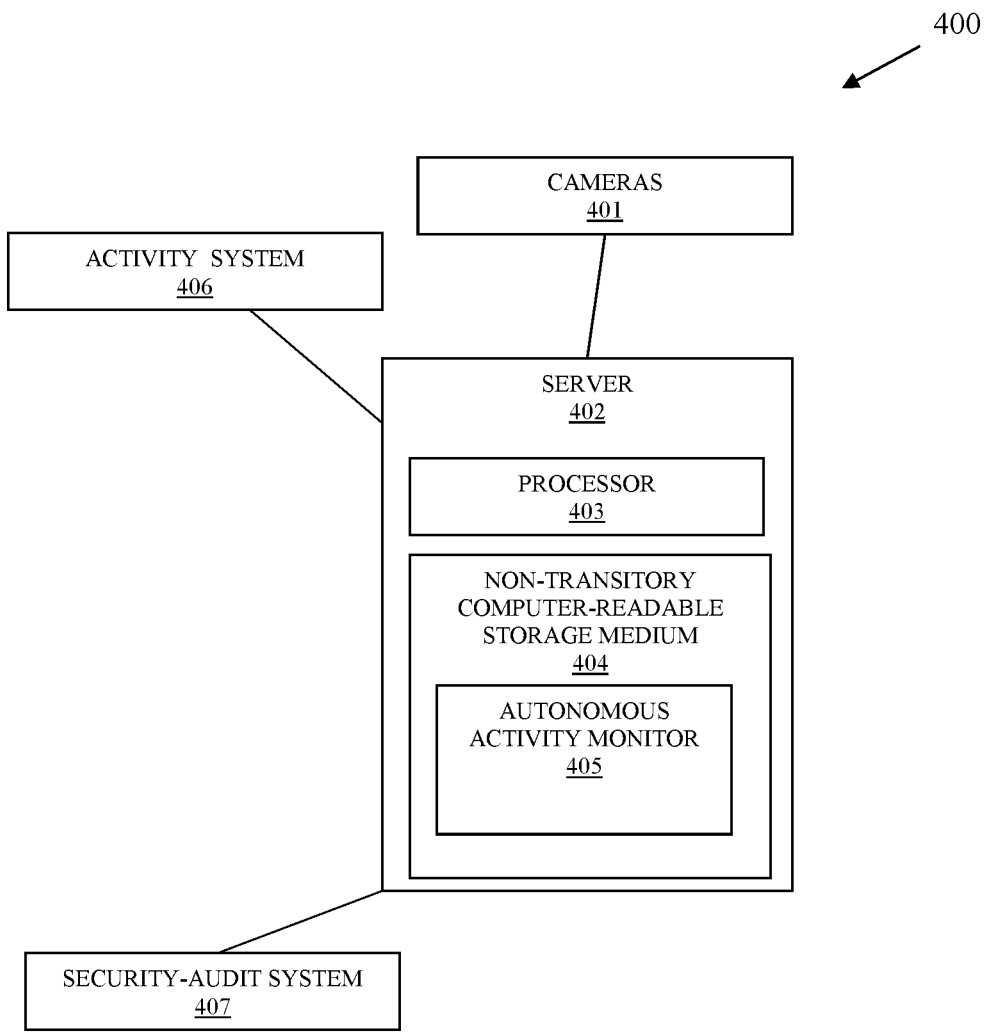
FIG. 4 is a diagram of another system for frictionless and autonomous activity and behavioral monitoring, according to an example embodiment.

FIG. 4 is a diagram of a system 400 for frictionless and autonomous activity and behavioral monitoring, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 includes a plurality cameras 401, a server 402, an activity system 406, and a security-audit system 407. The server 402 includes at least one hardware processor 403, a non-transitory computer-readable storage medium 404 having executable instructions representing an autonomous activity monitor 405.

The autonomous activity monitor 405 when executed from the non-transitory computer-readable storage medium 404 on the processor 403 is configured to cause the processor 403 to perform processing comprising: 1) identifying an activity of an activity type; 2) obtaining control data assigned to the activity type; 3) monitoring video captured by the cameras 401 for actions and behaviors of individuals engaged in performance of the activity based on the control data; 4) monitoring activity data produced from the activity system 406 for the activity based on the control data; 5) assembling activity audit data for the activity, the activity audit data comprising identifiers for: the activity, the activity type, the actions, the behaviors, the control data, types of activity data and the activity data, location information for locations associated with performance of the activity, time measurements for lengths of time to perform the actions and the activity, and the individuals; 6) storing and indexing the activity audit data in a database; and 7) notifying or alerting the security-audit system 407 when one or more conditions in the control data is violated during performance of the activity.

In an embodiment, the autonomous activity monitor 405 when executed from the non-transitory computer-readable storage medium 404 on the processor 403 is configured to further cause the processor 403 to perform additional processing comprising one or more of: 8) interactively engaging at least one of the individuals to provide assistance or guidance in performing at least one of the actions; and 9) scheduling a training for the at least one individual associated with properly performing the activity.

In an embodiment, the autonomous activity monitor 405 is all of or some combination of: 124-128, the method 200, and/or the method 300.

In an embodiment, the activity system 406 is a transaction system associated with performing transactions within an establishment.

In an embodiment, the activity system 406 is an administrative system associated with internal operations of an establishment.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   identifying an activity that is initiated within an establishment, wherein the activity comprises a set of predefined actions defined for the establishment;
   obtaining control data for the activity, wherein the control data is a data structure that defines process controls for the establishment, threat policies for the establishment, and internal procedures for the establishment, wherein obtaining further includes linking the activity to the control data, wherein internal procedures comprise internal business processes of the establishment;
   monitoring, through video feeds and activity data provided for the activity, performance of or progression of the activity based on the control data by using bounding boxes tracked in the video feeds and identifiers for the bounding boxes, wherein monitoring further includes tracking at least one hand of at least one individual and at least one arm of the at least one individual within at a first bounding box relative to a first object within a second bounding box;
   recording monitored data for the activity;
   associating the monitored data with the activity data and video feeds as activity audit data; and
   processing at least one automated action based on at least one threshold exceeded as determined from the activity audit data.

2. The method of claim 1, wherein identifying further includes receiving an activity identifier as a transaction identifier from a transaction system indicating that a transaction was initiated within the establishment.

3. The method of claim 1, wherein identifying further includes matching actions of individuals detected from the video feeds with the set of predefined actions that map to the activity.

4. The method of claim 3, wherein monitoring further includes evaluating conditions defined in the control data against actions of individuals, behaviors of the individuals, and other objects that detected in the video feeds and evaluating the conditions against the activity data.

5. The method of claim 4, wherein evaluating further includes tagging or labeling types associated with the actions, the behaviors, and the other objects in logged data.

6. The method of claim 5, wherein tagging or labeling further includes providing identifiers for the individuals within the logged data.

7. The method of claim 6, wherein tagging or labeling further includes providing an activity type for the activity and a control data identifier for the control data in the logged data.

8. The method of claim 7, wherein associating further includes linking a video clip associated with portions of the video feed that corresponds to the activity in the logged data.

9. The method of claim 8, wherein linking further includes indexing and storing the logged data as the monitored data in a database.

10. The method of claim 7, wherein linking further includes packaging the logged data as the monitored data in a target format.

11. The method of claim 10, wherein packaging further includes sending the monitored data in the target format to an automated system using an Application Programming Interface (API).

12. The method of claim 1, wherein processing further includes raising an alert to a security system along with a link to the monitored data including a second link to a video clip corresponding to the activity.

13. The method of claim 1, wherein processing further includes sending an audit request to an audit system along with a link to the monitored data including a second link to a video clip corresponding to the activity.

14. A method, comprising:
   receiving a request to monitor an activity, wherein the activity comprises a set of predefined actions defined for an establishment;
   obtaining monitor control data assigned to an activity type associated with the activity, wherein the monitor control data is a data structure that defines process controls for the establishment, threat policies for the establishment, and internal procedures for the establishment, wherein obtaining further includes linking the activity to the monitor control data, wherein internal procedures comprise internal business processes of the establishment;
   monitoring video of at least one individual associated with the activity for actions and behaviors by using bounding boxes tracked in the video and identifiers for the bounding boxes, wherein monitoring further includes tracking at least one hand and at least one arm of the at least one individual within a first bounding box relative to a first object within a second bounding box;
   acquiring activity data detected during performance of the activity;
   processing at least one remedial action defined in the monitor control data based on one or more of:
      the actions, the behaviors, and a portion of the activity data;
      assembling activity audit data comprising actions and behaviors of the at least one individual, a video clip associated with the activity from the video, and the activity data; and
      storing and indexing the activity audit data in a database.

15. The method of claim 14 further comprising generating statistics from the database with respect to the activity audit data and other activity audit data stored in the database for other activities of the activity type.

16. The method of claim 15 further comprising training a machine-learning algorithm for determining the at least one remedial action and other remedial actions associated with the other activity data using the activity audit data and the other activity audit data as input with the at least one remedial action and the other remedial actions as expected results from the machine-learning algorithm.

17. The method of claim 14, wherein receiving further includes receiving the request as an audit request for the activity type from an audit system.

18. The method of claim 14, wherein monitoring further includes monitoring audible words that are spoken by the at least one individual during performance of the activity.

19. A system, comprising:
   cameras configured to capture videos outside an establishment and inside the establishment;
   an activity system configured to process an operation of the establishment;

a server comprising a processor and a non-transitory computer-readable storage medium;

the non-transitory computer-readable storage medium comprising executable instructions representing an autonomous activity monitor;

the autonomous activity monitor when executed on the processor from the non-transitory computer-readable storage medium causing the processor to perform processing comprising:

identifying an activity of an activity type, wherein the activity comprises a set of predefined actions defined for the establishment;

obtaining control data assigned to the activity type, wherein the control data is a data structure that defines process controls for the establishment, threat policies for the establishment, and internal procedures for the establishment, wherein obtaining further includes linking the activity to the control data, wherein internal procedures comprise internal business processes of the establishment;

monitoring video captured by the cameras for actions and behaviors of individuals engaged in performance of the activity based on the control data by using bounding boxes tracked in the video and bounding box identifiers for the bounding boxes, wherein monitoring further includes tracking hands and arms of the individuals within at least some of the bounding boxes relative to objects within other bounding boxes;

monitoring activity data produced from the activity system for the activity based on the control data;

assembling activity audit data for the activity, the activity audit data comprising identifiers for:

the activity, the activity type, the actions, the behaviors, the control data, types of activity data and the activity data, location information for locations associated with performance of the activity, time measurements for lengths of time to perform the actions and the activity, and the individuals;

storing and indexing the activity audit data in a database; and notifying or alerting a security-audit system when one or more conditions in the control data is violated during performance of the activity.

20. The system of claim 19, wherein the autonomous activity monitor when executed on the processor from the non-transitory computer-readable storage medium further causing the processor to perform additional processing comprising one or more of:

interactively engaging at least one of the individuals and providing assistance or providing guidance in performing at least one of the actions; and scheduling a training for the at least one individual associated with properly performing the activity.

\* \* \* \* \*